(12) United States Patent
DiRienzo, Jr. et al.

(10) Patent No.: US 8,061,199 B2
(45) Date of Patent: Nov. 22, 2011

(54) MEASUREMENT SYSTEMS HAVING SEALS WITH PRESSURE RELIEF

(75) Inventors: Jules Joseph DiRienzo, Jr., Chalfont, PA (US); Kevin G. Hafer, Douglassville, PA (US); John Emiljan Naghski, Wyndmoor, PA (US); Travis Darrell Hopkins, Willow Grove, PA (US)

(73) Assignee: Ametek, Inc., Berwyn, PA (US)

( * ) Notice: Subject to any disclaimer, the term of this patent is extended or adjusted under 35 U.S.C. 154(b) by 499 days.

(21) Appl. No.: 12/142,484

(22) Filed: Jun. 19, 2008

(65) Prior Publication Data

US 2009/0315278 A1 Dec. 24, 2009

(51) Int. Cl.
*G01D 11/24* (2006.01)
*H01R 13/46* (2006.01)

(52) U.S. Cl. ............ 73/431; 174/520; 174/559; 174/64; 220/203.08

(58) Field of Classification Search ............ 73/431; 174/50, 50.5, 50.52, 520, 535, 559, 61, 62–64; 220/200, 203.01, 203.08
See application file for complete search history.

(56) References Cited

U.S. PATENT DOCUMENTS

| | | | | |
|---|---|---|---|---|
| 2,732,103 A * | 1/1956 | Wright | ............................ | 222/330 |
| 3,091,359 A * | 5/1963 | Wood | ............................ | 220/89.2 |
| 4,436,159 A * | 3/1984 | Revay | ............................ | 169/28 |
| 4,461,937 A * | 7/1984 | Boni | ............................ | 200/82 B |
| 4,579,001 A * | 4/1986 | Hosterman | ............................ | 73/714 |
| 4,930,361 A * | 6/1990 | Nimberger | ............................ | 73/864.62 |
| 5,583,490 A * | 12/1996 | Santos et al. | ............................ | 340/626 |
| 5,669,263 A | 9/1997 | Borchers et al. | | |
| 5,701,932 A | 12/1997 | Bourscheid et al. | | |
| 5,907,112 A | 5/1999 | Queyquep | | |
| 5,971,356 A * | 10/1999 | Offenwanger et al. | .. | 251/129.07 |
| 6,269,883 B1 * | 8/2001 | Gissler et al. | ............................ | 166/340 |
| 6,540,029 B2 * | 4/2003 | Snoeys et al. | ............................ | 169/46 |
| 7,122,743 B2 * | 10/2006 | Babiarz et al. | ............................ | 174/100 |
| 7,273,068 B2 * | 9/2007 | Ballenger et al. | ............................ | 137/554 |
| 7,282,184 B2 * | 10/2007 | King et al. | ............................ | 422/130 |
| 7,363,811 B2 * | 4/2008 | Dannhauer et al. | ............................ | 73/273 |
| 7,392,766 B2 * | 7/2008 | Jackson | ............................ | 122/14.3 |
| 7,647,927 B2 * | 1/2010 | Teetzel et al. | ............................ | 128/205.12 |
| 7,740,081 B2 * | 6/2010 | Edwards et al. | ............................ | 169/60 |
| 2005/0223781 A1 | 10/2005 | Renk et al. | | |
| 2006/0021882 A1 * | 2/2006 | Kaye et al. | ............................ | 206/6 |
| 2007/0041789 A1 * | 2/2007 | Monroe et al. | ............................ | 405/54 |
| 2007/0161298 A1 * | 7/2007 | Moore | ............................ | 439/797 |

FOREIGN PATENT DOCUMENTS

WO WO 01/77551 10/2001

* cited by examiner

*Primary Examiner* — David A. Rogers
(74) *Attorney, Agent, or Firm* — Stradley Ronon Stevens & Young LLP

(57) ABSTRACT

A measurement system having a first and second seal to create a sealed interface with a fluid and further having a rupturable barrier configured to relieve pressure when the pressure imparted to the first seal is less than the pressure imparted to the second seal, is disclosed. More particularly, the pressure relief element, which may be a rupturable barrier, is configured and positioned so that the second seal pressure limit is less than the first seal pressure limit. The primary elements of the system include the system housing, a sensing element having a first seal, with the sensing element within the housing, a second seal in fluid communication with the first seal, and a barrier that is rupturable when the pressure on the first seal is less than the pressure on the second seal.

3 Claims, 9 Drawing Sheets

MEASUREMENT SYSTEMS HAVING SEALS WITH PRESSURE RELIEF

TECHNICAL FIELD

The present application is directed to measurement systems having seals that are capable of forming a sealed interface with a fluid, and features that can relieve pressure exerted by the fluid on the seals.

BACKGROUND

FIG. 1 diagrammatically depicts a conventional installation for a measurement system 300. The measurement system 300 includes a probe or sensing element 301. The sensing element 301 is mounted on, and extends into a tank 302 that holds a flammable or combustible fluid such as gasoline. The measurement system 300 can be used to determine the level of material in the tank 302.

The measurement system 300 also includes a housing or junction box 304. The junction box 304 encloses a junction between electrical leads from the sensing element 301 and an electrical cable 308. The cable 308 can carry electrical signals generated by the sensing element 301 to signal processing equipment 310 located in a control room 312 or other location remote from the tank 302. The cable 308 is housed in a protective metal conduit 314 that extends between the junction box 304 and the control room 312.

The control room 312 is designated a "non-hazardous" area, in accordance with local guidelines such as the National Electrical Code (NEC).

The sensing element 301 is normally exposed to the flammable or combustible fluid within the tank 302, and is therefore considered to reside in an area designated "hazardous" in accordance with local guidelines such as the NEC.

The sensing element 301 is equipped with a seal 320 that, under normal operating conditions, prevents the fluid in the tank 302 from leaking past the sensing element 301 and into the junction box 304. Leakage in the seal 320, however, can permit the fluid to migrate into the junction box 304 and the attached conduit 314. The sensing element 301, which is directly exposed to the fluid within the tank 302 during normal operating conditions, is configured to be absent of any sources of energy that can potentially ignite the fluid. This type of configuration is characterized as "Intrinsically safe," in accordance with local guidelines such as the NEC.

The junction box 304, the conduit 314, and the seal fittings 319 (poured seals containing porous material, e.g., CHICO®) are components within the "explosion proof" system, in accordance with local guidelines, such as the NEC. Moreover, the conduit 314 and the junction box 304 are made sufficiently robust to withstand the relatively high internal pressure that may occur during an explosion.

Although the seal fittings 319 can restrict energy from an explosion, the porosity of the seal fittings 319 permits fluid to pass therethrough. Thus, fluid that leaks through the seal 320 of the sensing element 301 can potentially reach the control room 312 by way of the junction box 304 and the conduit 314.

A second, or secondary seal 330 can be mounted on the conduit 314, to prevent the leaked fluid from migrating to the control room 312 by way of the conduit 314. The secondary seal 330 can include a housing through which the cable 308 is routed. The interior of the housing can be potted once the cable 308 has been routed therethrough.

The secondary seal 330 is located in a hazardous area and is a component in a system employing explosion proof as the method of protection. Therefore, the seal 330 must be able to withstand relatively high internal pressure in order to contain an explosion that may occur. The secondary seal 330 is thus larger, more robust, and more expensive than a seal intended for use in an area not designated as using explosion proof as the method of protection. Moreover, the potting of the secondary seal 330 is normally performed in the field as the secondary seal 330 is being installed, thereby making the time and effort needed to install the seal 330 greater than would otherwise be required.

The secondary seal 330 can potentially be exposed to an overpressure condition if substantial leakage occurs through the seal 320, particularly when the tank 302 is pressurized. Excessive pressure can damage the secondary seal 330, which in turn can result in migration of the leaked fluid past the secondary seal 330 and into the control room 312.

Pressure relief for the secondary seal 330 can be provided by configuring the junction box 304 to crack or fracture at a predetermined pressure that is lower than the maximum rated operating pressure of the secondary seal 330. Because the junction box 304 is a component in an explosion proof system, the pressure at which the junction box 304 will crack or fracture needs to be higher than the internal pressure that the junction box 304 must contain during an explosion, thereby increasing the maximum rated pressure of the secondary seal 330 to higher level than would otherwise be required.

SUMMARY

Embodiments of systems include primary and secondary seals, and pressure-relief devices that are configured and positioned so that the secondary seals can have maximum rated capacities substantially less than those of the primary seals.

Embodiments of systems comprise a housing, and a sensing element mounted on the housing for measuring a characteristic of a fluid. The sensing element comprises a first seal for discouraging leakage of the fluid into the housing. The embodiments also comprise a second seal in fluid communication with the first seal, and a rupturable barrier. A first side of the rupturable barrier is in fluid communication with the first and second seals. The rupturable barrier is configured to rupture when the pressure acting on the first side of the rupturable barrier is less than a maximum rated operating pressure of the second seal.

Embodiments of systems comprise a housing, sensing element mounted on the housing and comprising a primary seal, and a rupturable barrier mounted on the housing and capable of isolating an interior of the housing from an ambient environment around the housing. The embodiments also comprise a secondary seal mounted on the housing, and an electrical conductor mounted on and extending through the secondary seal. The primary and secondary seals and the membrane are exposed to the interior of the housing, and the membrane is configured to rupture before a fluid pressure in the interior of the housing causes an overpressure condition in the secondary seal.

Other embodiments of systems comprise a housing, a first seal, a second seal in fluid communication with the first seal, an electrical conductor extending through the second seal, and a rupturable barrier. A first side of the rupturable barrier is in fluid communication with the first and second seals; and the rupturable barrier is configured to rupture when the pressure acting on the first side of the rupturable barrier is less than a maximum rated operating pressure of the second seal.

BRIEF DESCRIPTION OF THE DRAWINGS

The foregoing summary, as well as, the following detailed description of preferred embodiments, are better understood when read in conjunction with the appended drawings. The drawings are presented for illustrative purposes only, and the scope of the appended claims is not limited to the specific embodiments shown in the drawings. In the drawings:

DETAILED DESCRIPTION OF PREFERRED EMBODIMENTS

Figure 1:
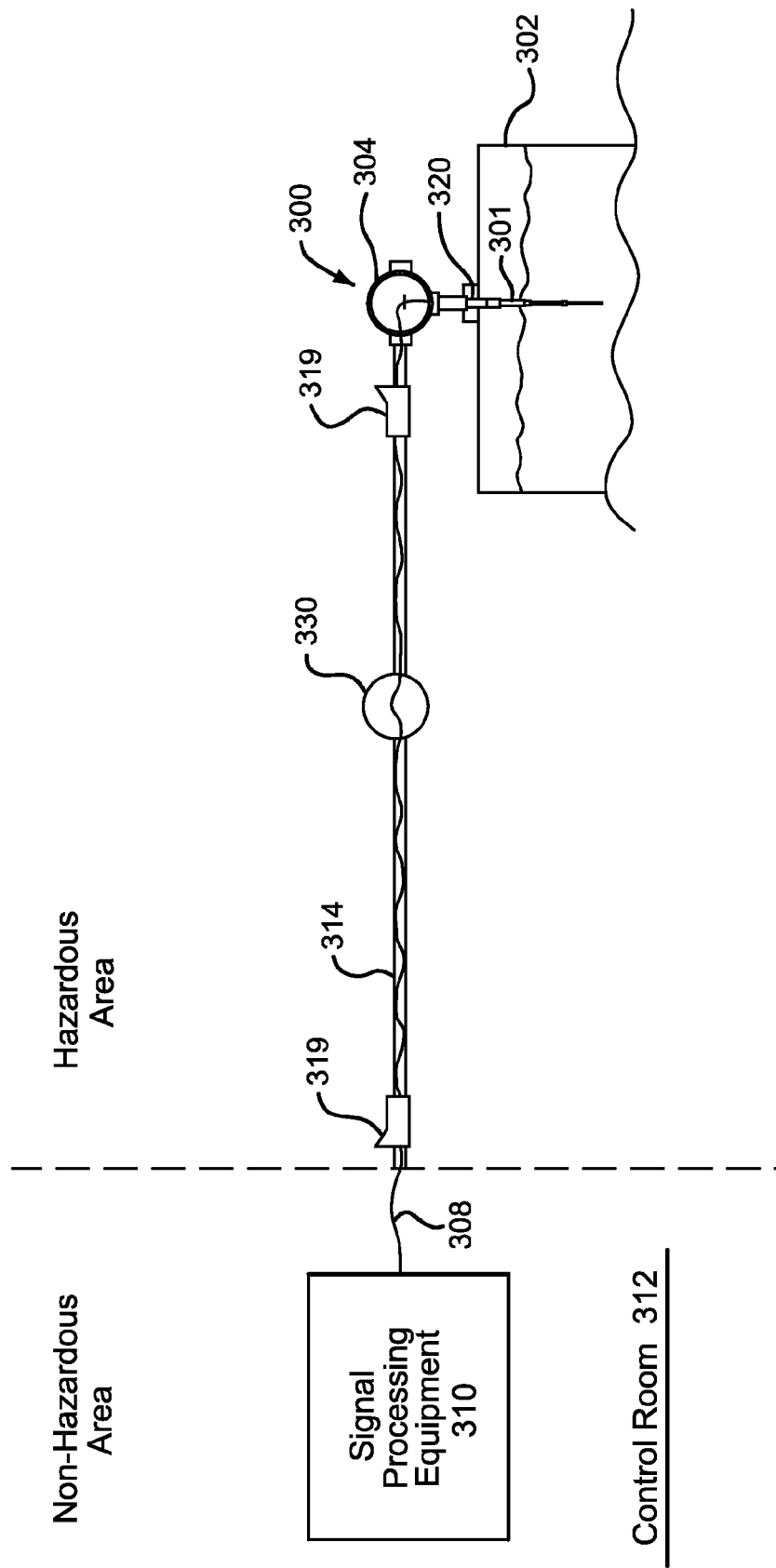
FIG. 1 is a diagrammatic depiction of a prior-art fluid-level measurement system installed on a tank and electrically connected to signal processing equipment located in a control room remote from the tank.
Figure 2:
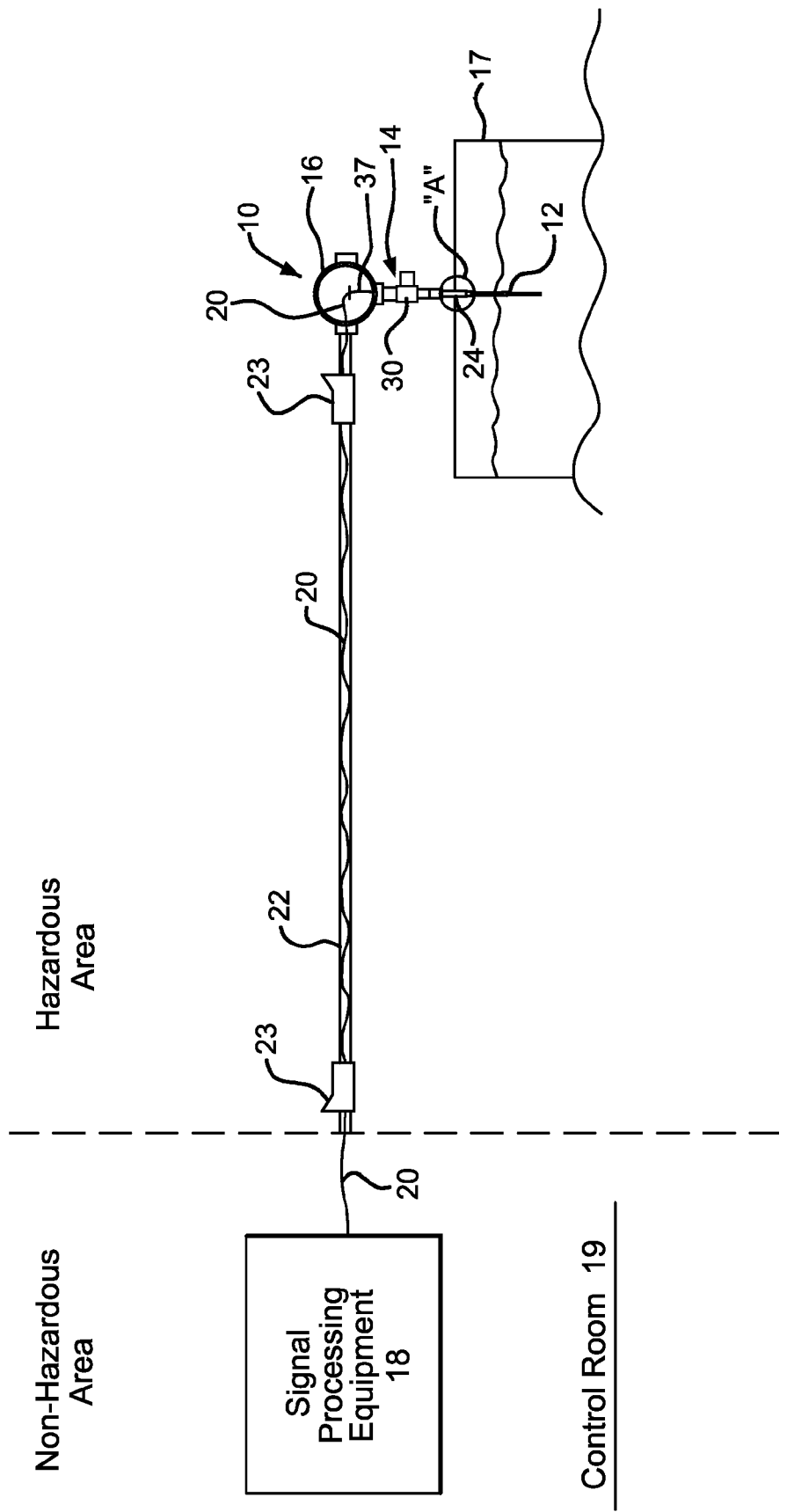
FIG. 2 is a diagrammatic depiction of an embodiment of a fluid-level measurement system installed on a tank and electrically connected to signal processing equipment located in a control room remote from the tank.

FIGS. 2-6B depict an embodiment of a measurement system 10. The measurement system 10 comprises a probe or sensing element 12, a pressure-relief device 14, and a housing or electrical junction box 16, as shown in FIG. 2. The sensing element 12 can be, for example, a capacitance probe for determining whether the level of a fluid in a storage tank 17 is at or above a particular level. The fluid can be, for example, a flammable or combustible fluid such as gasoline. The use of the pressure-relief device 14 in conjunction with a capacitance-type liquid-level probe is disclosed for exemplary purposes only; the pressure-relief device 14 can be used in conjunction with other types of sensing elements in alternative embodiments.

The junction box 16 encloses a junction between electrical leads from the sensing element 12 and an electrical cable 20. The junction box 16 can also house signal processing equipment in alternative embodiments of the measurement system 10. The cable 20 can carry electrical signals generated by the sensing element 12 to signal processing equipment 18 located in a control room 19 or other location remote from the tank 17, as shown in FIG. 2. The cable 20 is housed in a protective metal conduit 22 that extends between the junction box 16 and the control room 19. The metal conduit 22 is connected to a flange formed on the junction box 16. An interior volume of the conduit 22 is in fluid communication with an interior volume of the junction box 16.

The control room 19 is designated a "non-hazardous" area, in accordance with local guidelines, such as the NEC.

The sensing element 12, which is directly exposed to the flammable or combustible fluid in the tank 17, is installed into an area designated as a hazardous area in accordance with local guidelines, such as the NEC. The sensing element 12 is configured to an intrinsically safe standard, i.e., the sensing element 12 is configured to be absent of any sources of energy that can potentially ignite the fluid.

The pressure-relief device 14 is a component of an intrinsically safe system. The junction box 16, conduit 22, and seal fittings 23 are components of an explosion-proof system. Moreover, the conduit 22, the junction box 16, and the seal fittings 23 are made robust enough to withstand the relatively high internal pressure that may occur during an explosion.

Figure 5:
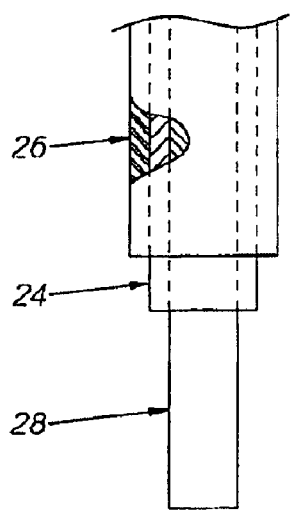
FIG. 5 is a partial cutaway view of the area designated "A" in FIG. 2.
Figure 6A:
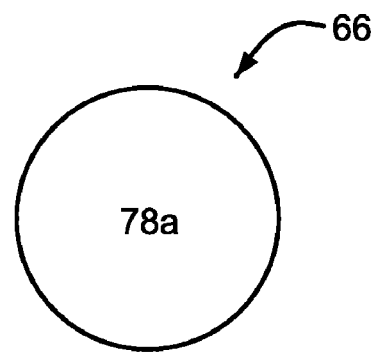
FIGS. 6A and 6B are front and side views, respectively, of a membrane of the pressure-relief device shown in FIGS. 3 and 4.
Figure 6B:
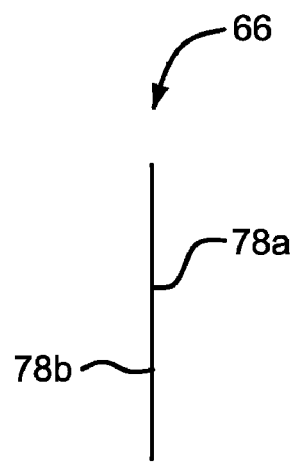

The sensing element 12 includes a seal 24 that, under normal operating conditions, prevents the fluid in the tank 17 from migrating past the sensing element 12. The seal 24 can be formed, for example, from a layer of TEFLON® packed between the an outer casing 26 and an inner casing 28 of the sensing element 12, as shown in FIG. 5. This particular configuration for the seal 24 is specified for exemplary purposes only; other suitable configurations for the seal 24, such as a resilient ring or bushing, can be used in alternative embodiments.

The pressure-relief device 14 acts as a secondary seal in relation to the seal 24. In particular, the pressure-relief device 14 can inhibit fluid that leaks past the seal 24 from entering the conduit 22 by way of the junction box 16, and potentially reaching the control room 19 via the conduit 22. The pressure-relief device 14, as discussed below, includes a rupturable barrier that helps to prevent an overpressure condition within the pressure-relief device 14.

Figure 3:
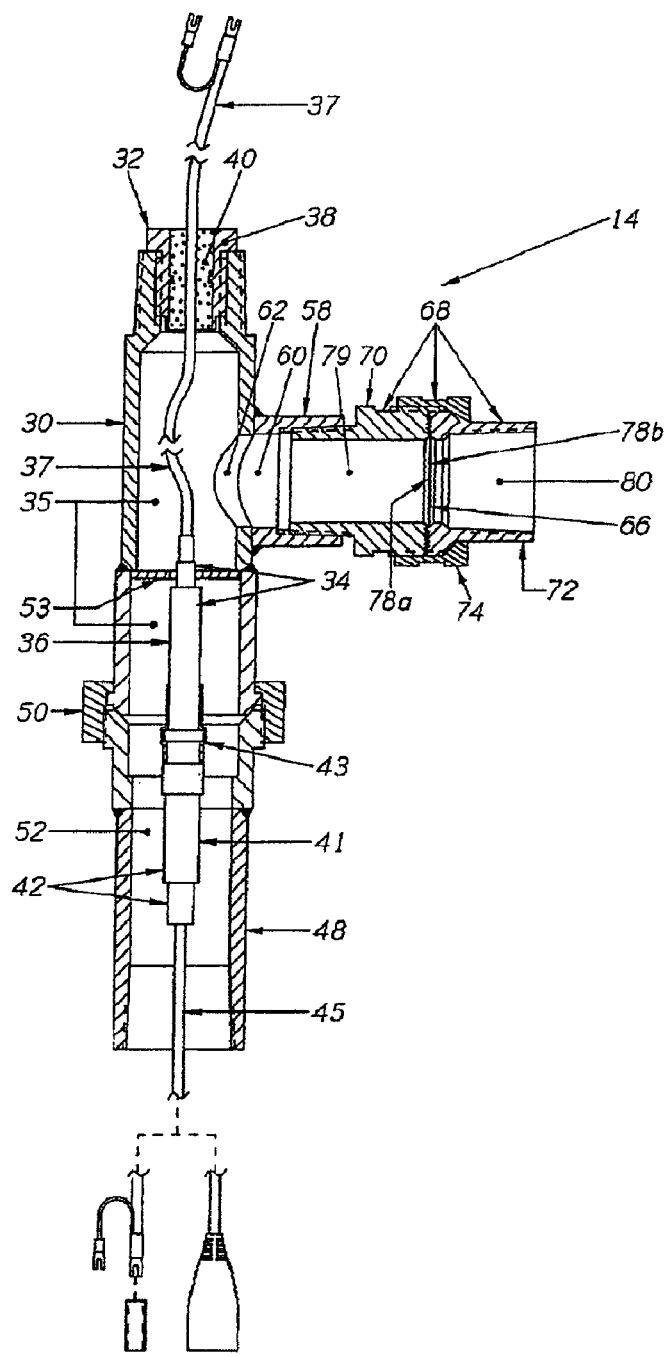
FIG. 3 is a longitudinal cross-sectional view of a pressure-relief device of the fluid-level measurement system shown in FIG. 2.

The pressure-relief device 14 includes a substantially cylindrical housing 30, a seal 32 mounted on a first end of the housing 30, and a connector 34, as shown in FIG. 3. The housing 30 has an interior volume 35.

The connector 34 can include a jack 36, and an insulated lead 37 electrically and mechanically connected to the jack 36. The jack 36 and a portion of the lead 37 are located within the interior volume 35, as shown in FIG. 3. The jack 36 can mate with a complementary jack 41 of a connector 42 of the sensing element 12. A heat shrink sleeve 43 or other suitable type of seal can be disposed around the end portion of the jack 36 as shown in FIG. 3, to help prevent fluid from infiltrating into the insulative jacket of the lead 37, and migrating past the seal 32 by way of the lead 37.

Figure 4:
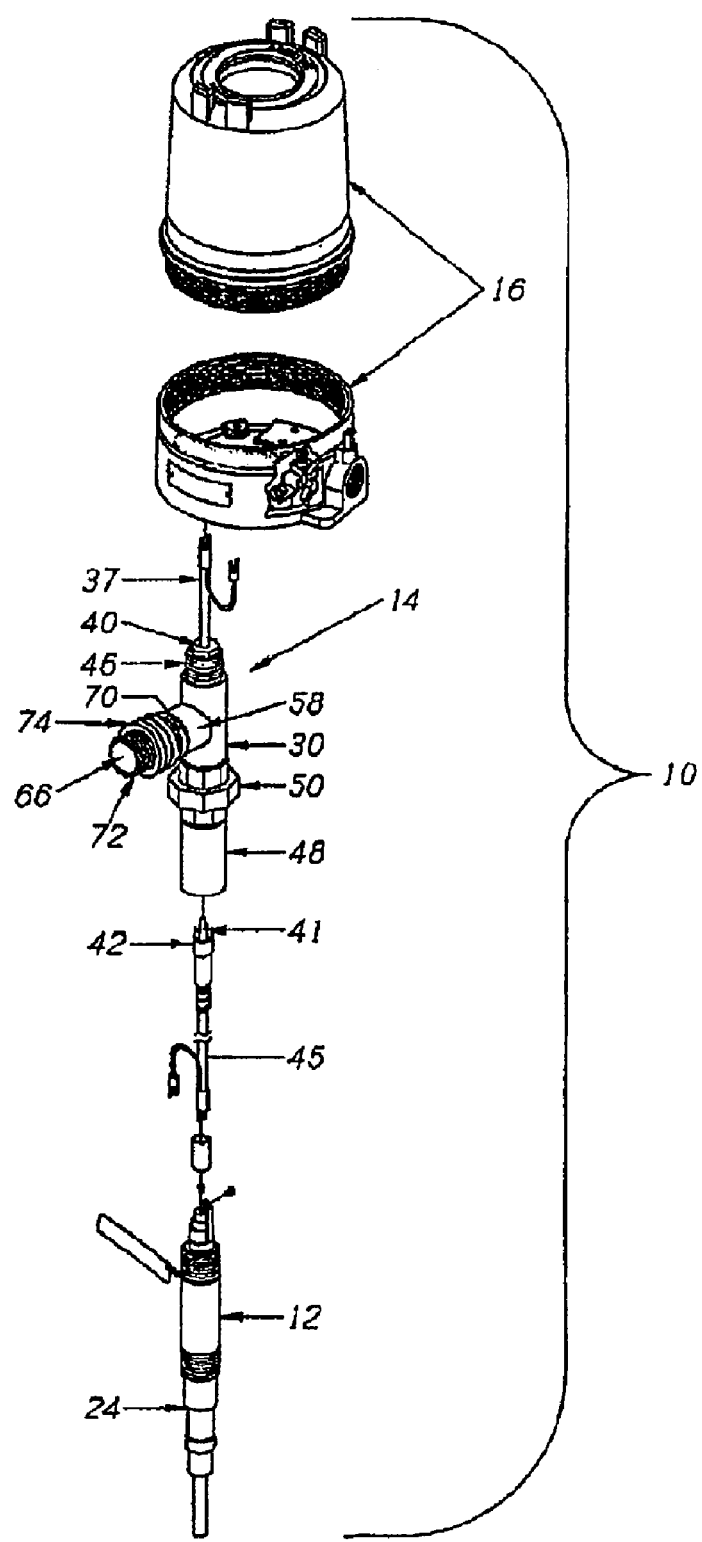
FIG. 4 is an exploded perspective view of a portion of the fluid-level measurement system shown in FIG. 2, including the pressure-relief device shown in FIG. 3.

The seal 32 can include a metallic jacket 38, and a sealing material 40 located within the jacket 38, as shown in FIG. 3. The jacket 38 can be mounted on a first end of the housing 30 by a suitable means such as complementary threads formed on the jacket 38 and the housing 30. The lead 37 extends through the sealing material 40 and projects from the first end of the housing 30, as shown in FIG. 3. The sealing material 40 can be a material suitable for forming a durable, fluid-tight seal around the lead 37. For example, the sealing material 40 can be epoxy. The first end of the housing 30 can have threads 46 formed on an exterior thereof, as shown in FIG. 4. The threads 46 mate with complementary threads on a flange formed on the junction box 16, to connect the pressure-relief device 14 to the junction box 16. The junction box 16 and the housing 30 can be unitarily formed in alternative embodiments. The portion of the lead 37 that projects from the first end of the housing 30 extends into the interior volume of the junction box 16, wherein the lead 37 is electrically connected to the cable 20, as shown in FIG. 2.

A restrictor plate, or orifice 53, the function of which is discussed below, is positioned within the interior volume 35.

The pressure-relief device 14 can also include a sleeve 48, as shown in FIGS. 3 and 4. A first end of sleeve 48 can be connected to a second end of the housing 30 by a suitable means such as a compression fitting 50. The sleeve 48 and the housing 30 can be unitarily formed in alternative embodiments. A second end of the sleeve 48 can be connected to the sensing element 12 by complementary threads formed on the interior of the sleeve 48 and the exterior of the sensing element 12.

The sleeve 48 defines an interior volume 52, as shown in FIG. 3. The interior volume 52 accommodates the jack 41, and a portion of a lead 45 of the connector 42. The pressure-relief device 14 can further include a cylindrical flange 58, as shown in FIGS. 3 and 4. The flange 58 is secured to a side of the housing 30 by a suitable means such as welding. An interior volume 60 of the flange 58 is in fluid communication with the interior volume 35 of the sleeve 30 by way of a penetration 62 formed in the sleeve 30.

The pressure-relief device 14 can further include a rupturable barrier in the form of a substantially circular membrane 66, and a fitting 68 that houses the membrane 66. The membrane 66 is depicted in FIGS. 3, 4, 6A, and 6B. The membrane 66 can have a shape other than circular in alternative embodiments.

The fitting 68 includes a first portion 70, a second portion 72, and a union 74, as shown in FIGS. 3 and 4. The first portion 70 can be mounted on the flange 58 by a suitable means such as complementary threads formed on the first portion 70 and the flange 58. The flange 58 and the first portion 70 can be unitarily formed in alternative embodiments.

The first portion 70 of the fitting 68 can be secured to the second portion 72 by the union 74. The union 74 has threads that engage complementary threads on the first portion 70. The union 74 also has an angled surface that engages a corresponding angled surface on the second portion 72.

The membrane 66 is mounted in the fitting 68. In particular, an outer periphery of the membrane 66 is sandwiched between the first portion 70 and the second portion 72 of the fitting 68 as shown in FIG. 3. The outer periphery of the membrane 66 can be attached to the first portion 70 and/or the second portion 72 using adhesive or other suitable means. A first side 78a of the membrane 66 is thus exposed to the interior volume 79 of the first portion 70, and a second side 78b of the membrane 66 is exposed to an interior volume 80 of the second portion 72.

The interior volume 35 of the housing 30, the interior volume 52 of the sleeve 48, the interior volume 60 of the flange 58, and the interior volume 79 of the first portion 70 are hereinafter referred to collectively as "the interior" of the pressure-relief device 14.

The membrane 66 is configured to rupture when the pressure differential across the membrane 66 reaches a predetermined level. This feature, as discussed below, can help to prevent an overpressure condition in the seal 32. The membrane 66 can be formed from a gas and liquid-impermeable material that will rupture at the desired pressure differential when formed into a relatively thin layer. For example, the membrane 66 can be formed from 0.010-inch thick TEFLON®. A particular thickness and material for the membrane 66 are specified for exemplary purposes only. The thickness of the membrane 66, and the type of material from which the membrane 66 is formed are application-dependent, and can vary with factors such as the desired pressure differential at which the membrane 66 will rupture, the type of fluids to which the membrane 66 may be exposed, etc.

Specific details of the fitting 68 are presented for exemplary purposes only. The membrane 66 can be mounted using other arrangements in alternative embodiments.

The fluid within the tank 17 is normally prevented from reaching the conduit 22 by the primary seal 24 in the sensing element 12. If a leak develops in the seal 24, the pressure-relief device 14 can act as a secondary seal that prevents fluid that leaks past the seal 24 from entering the conduit 22 and potentially migrating to the control room 19 by way of the conduit 22.

The membrane 66 can act as a pressure-relief device that prevents the fluid that leaks past the seal 24 from exerting excessive pressure on the seal 32. In particular, leakage of fluid past the seal 24 permits the fluid to enter the interior of the pressure-relief device 14. The fluid is initially contained within the interior by the seal 32 and the membrane 66.

A substantial amount of fluid leakage past the seal 24, however, can potentially fill the interior of the pressure-relief device 14, and can cause the fluid pressure therein to reach a level that can compromise the integrity of the seal 32, particularly in applications where the tank 17 is pressurized. The membrane 66 is configured to rupture when the fluid pressure within the interior volume reaches a predetermined level, to protect the seal 32 from an overpressure condition. In particular, the membrane 66 is configured to rupture when the first side 78a of the membrane 66 is exposed to a pressure that is lower than the maximum rated operating pressure for the seal 32. For example, the seal 32 can have a maximum rated operating pressure of approximately 150 psi; and the membrane 66 can be configured to rupture when the fluid pressure acting on the first side 78a of the membrane 66 is approximately 100 psi (the fluid pressure acting on the second side 78b of the membrane 66 is approximately atmospheric pressure in the exemplary installation depicted herein).

The membrane 66, upon rupturing, presents little or no restriction to the flow of fluid therethrough. The fluid within the housing 30 can therefore flow from the interior of the housing 30, through the restrictor plate or orifice 53 and the fitting 68, and out of the pressure-relief device 14, thereby relieving the pressure on the seal 32. The restrictor plate 53 is sized to limit the maximum flow rate of the fluid into the pressure-relief device 14 to a level at which all of the fluid can exit the pressure-relief device 14 by way of the fitting 68 at a reduced pressure.

The fluid exiting the fitting 68 can be directed to a container or catch basin using a hose (not shown) or other suitable means attached to the second portion 72 of the fitting 68. The flow of fluid exiting fitting 68 or flowing into the container or catch basin provides a visual annunciation that the seal 24 in the sensing element 12 has been compromised, and that substantial leakage of fluid into the housing 30 is occurring.

After rupturing, the membrane 66 presents little or no flow restriction. A breather, by contrast, presents a constant substantial flow restriction. A breather therefore is not as effective as a rupturable barrier at providing pressure relief. Thus, the seal in a seal assembly that uses a breather as the pressure-relief means may need to be rated for a higher maximum operating pressure than a seal in a comparable seal assembly that utilizes a rupturable barrier.

Moreover, by positioning the pressure-relief device 14 and, in particular, the housing 30 and its pressure relief feature, within a system utilizing intrinsic safety rather than explosion proof as a method of protection, the membrane 66 does not need to be configured to withstand the relatively high pressure present during an explosion.

The use of an impermeable barrier such as the membrane 66 helps to isolate the interior of the pressure relief device 14 from the ambient environment around the pressure-relief device 14. Thus, the membrane 66 can protect the connector 34 of the pressure-relief device 14 and the connector 42 of the sensing element 12 from exposure to moisture, corrosive or caustic gases, and other potentially harmful elements that may be present in the environment around the pressure-relief device 14. A pressure-relief device incorporating a breather, by contrast, can permit gases and liquid to infiltrate into the interior of the pressure-relief device 14 from the ambient environment, potentially exposing the connectors 34, 42 to the detrimental effect of such materials.

The pressure-relief device 14 has the pressure-relief means integrated therein, and can be provided to the end user in a ready-to-use condition. Thus, the end user does not need to provide a separate pressure-relief device in, for example, the conduit 22. Moreover, there is no need to install potting within the seal assembly during installation.

Figure 7:
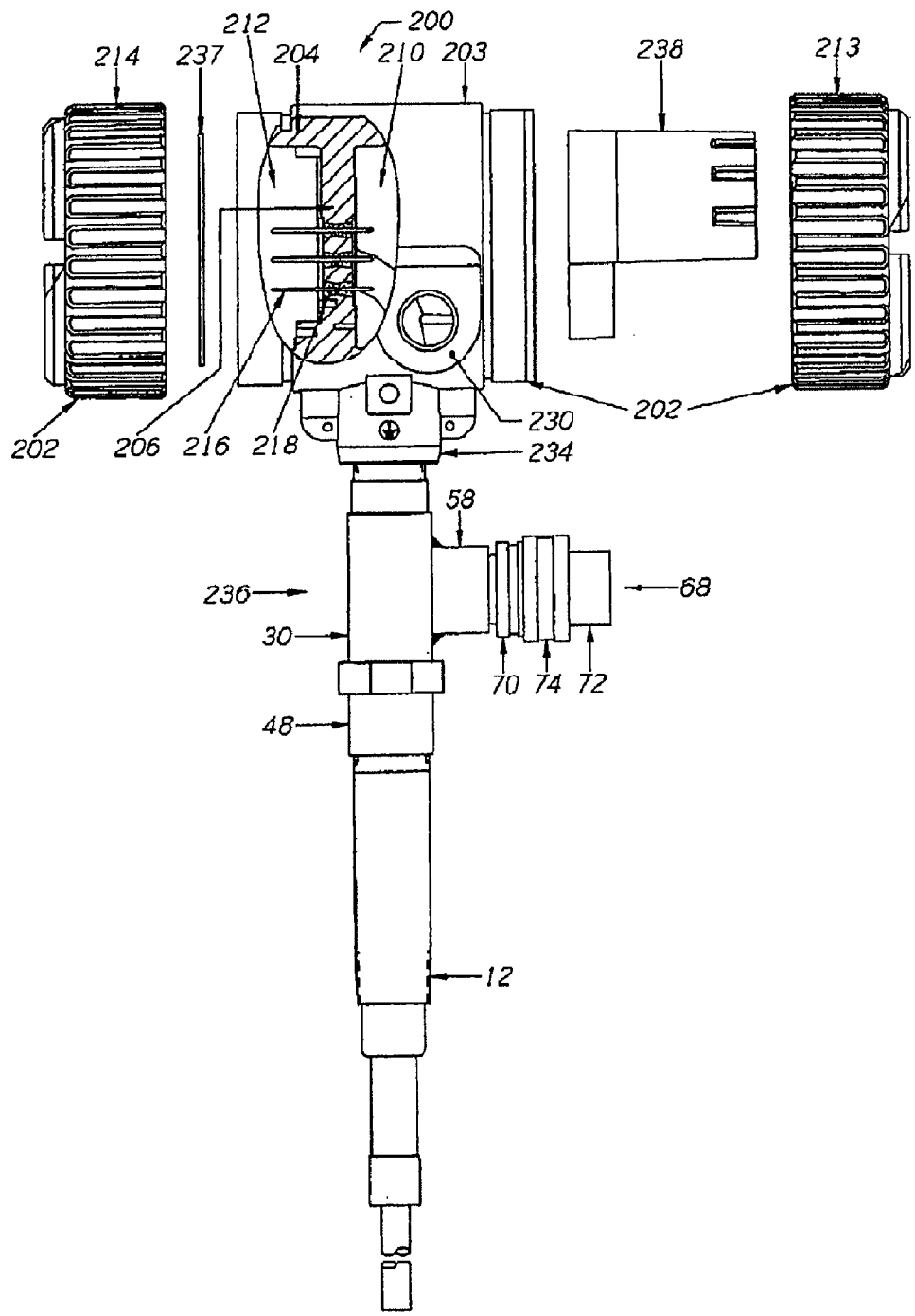
FIG. 7 is a partial-cutaway side view of an alternative embodiment of the fluid-level measurement system shown in FIGS. 2-6B.
Figure 8:
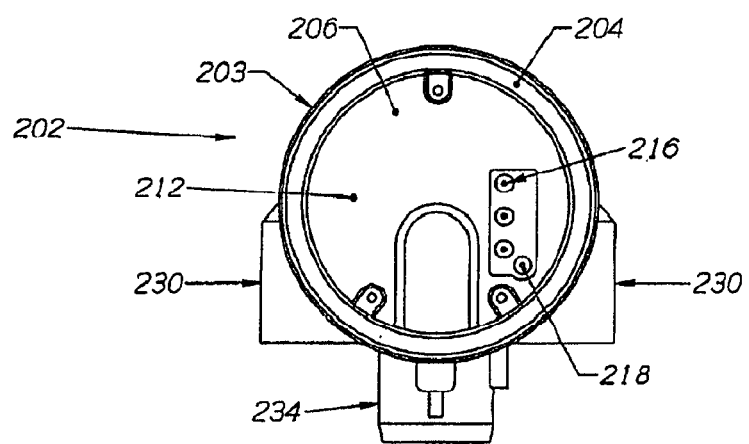
FIG. 8 is a side view of a main portion of an electrical junction box of the fluid-level measurement system shown in FIG. 7.

FIGS. 7 and 8 depict an alternative embodiment in the form of a measurement system 200. The measurement system 200 can be used in conjunction with a sensing element such as the sensing element 12 of the measurement system 10. The measurement system 200 facilitates an electrical connection between the sensing element 12 and the signal processing equipment 18 located in the control room 19 or other location remote from the tank 17, as discussed above in relation to the measurement system 10. An electrical cable, such as the cable 20 discussed above in relation to the measurement system 10, can be used to route the signals generated by the sensing element 12 to the signal processing equipment 18. The cable 20 can be enclosed in the protective metal conduit 22 equipped with seal fittings 23 as discussed above.

The measurement system 200 includes a housing or electrical junction box 202, as shown in FIGS. 7 and 8. The junction box 202 has main portion 203 comprising a substantially cylindrical outer wall 204. The junction box 202 also includes an interior wall 206 that divides the interior of the housing into a first interior volume 210 and a second interior volume 212. The junction box 202 also includes a first cover 213 and a second cover 214 that mate with the outer wall 204 and further define the respective first and second interior volumes 210, 212.

The measurement system 200 also includes a plurality of electrically-conductive pins 216 that extend through the interior wall 206, as shown in FIGS. 7 and 8. Each pin 216 is coaxially mounted on a seal 218 that forms a sealed interface between the pin 216 and the interior wall 206.

The conduit 22 can be mated with a threaded flange 230 formed on the junction box 202. The first interior volume 210 of the junction box 202 is in fluid communication with the interior of the conduit 22 when the conduit 22 is mated with the junction box 202.

The measurement system 200 also includes a pressure-relief device 236, as shown in FIG. 7. The pressure-relief device 236 is substantially identical to the pressure-relief device 14, with the exception that the pressure-relief device 236 does not include the seal 32. Substantially identical components of the pressure-relief device 236 and the pressure-relief device 14 are denoted hereinafter by identical reference characters.

A first end of a housing 30 of the pressure-relief device 236 can mate with a threaded flange 234 formed on the junction box 202. A second end of the housing 30 can mate with the sensing element 12 via complementary threads formed thereon.

The interior wall 206 forms the boundary between the portions of the measurement system 200 configured as explosion-proof and intrinsically safe. In particular, the components located within the first interior volume 210 are configured to an explosion proof standard. The components located within the second interior volume 212, as well as the pressure-relief device 236 and the sensing element 12, are configured to an intrinsically safe standard.

A lead of the connector 42 of the sensing element 12 can extend through the housing 30 and into the second interior volume 212 of the junction box 202. A jack mounted on the lead can mate with an electrical sensing assembly 237, which in turn mates with the pins 216 within the second interior volume 212 as shown in FIG. 7. The pins 216 also mate with an electronic assembly 238, e.g., a power supply located within first interior volume 210, to establish an electrical connection between the sensing element 12 and the electronic assembly 238. The cable 20 can be routed through the conduit 22 to electrically connect the measurement system 200 to the signal processing equipment 18.

The seals 218 function as secondary seals when the primary seal 24 on the sensing element 12 leaks and permits fluid to enter the second interior volume 212 by way of the interior of the pressure-relief device 14. The membrane 66 of the pressure-relief device 236 can rupture if and when the fluid pressure within the second interior volume 212 reaches a predetermined level that is less than the maximum rated operating pressure of the seals 218, thereby relieving the pressure on the seals 218.

Figure 9:
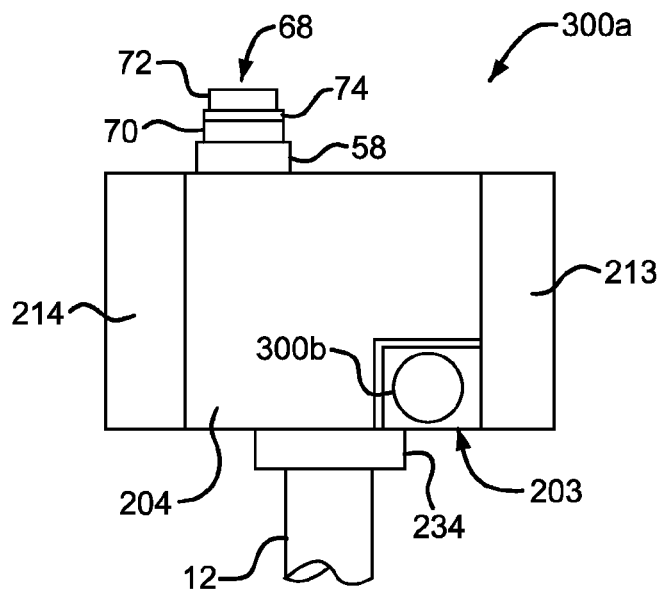
FIG. 9 is a side view of another alternative embodiment of the fluid-level measurement systems shown in FIGS. 2-8.
Figure 10:
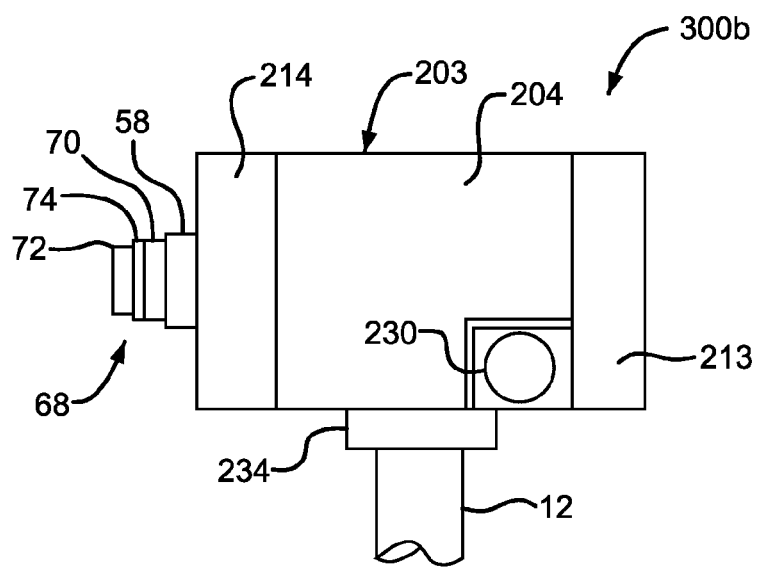
FIG. 10 is a side view of another alternative embodiment of the fluid-level measurement systems shown in FIGS. 2-9.

The housing 30 of the pressure-relief device 236 can be integrally formed with the junction 202 box in alternative embodiments of the measurement system 200. In other alternative embodiments, such as the measurement system 300a depicted in FIG. 9, the flange 58, the membrane 66, and the fitting 68 can be mounted directly on outer wall 204 of the junction box 202 without the use of the housing 30 or the sleeve 48, and the sensing element 12 can be connected directly to the junction box 202. In still other alternative embodiments, such as the measurement system 300b depicted in FIG. 10, the flange 58, the membrane 66, and the fitting 68 can be mounted directly on second cover 214 of the junction box 202 without the use of the housing 30 or the sleeve 48, and the sensing element 12 can be connected directly to the junction box 202.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, can make numerous modifications to the invention as described herein, and changes may be made without departing from the scope and spirit of the invention as defined by the appended claims.

What is claimed is:

1. A measurement system, comprising:
  a housing;
  a sensing element mounted on the housing for measuring a characteristic of a fluid, the sensing element comprising a first seal for discouraging leakage of the fluid into the housing;
  a second seal in fluid communication with the first seal;
  a rupturable barrier;
  an electrical conductor extending through said second seal, said electrical conductor is mounted coaxially with said second seal;

an electrical junction box connected to said housing, wherein the electrical junction box is configured to mate with a conduit and to receive an electrical cable routed through the conduit;

wherein the electrical junction box comprises an outer wall, a cover mountable on the outer wall, and an inner wall that divides the electrical junction box into a first and a second interior volume;

the second seal is mounted on the inner wall so that the electrical conductor extends through the inner wall between the first and second interior volumes;

a wire from the sensing element extends into the second interior volume by way of the housing;

the first interior volume is configured to receive the electrical cable routed through the conduit, and the rupturable barrier is in fluid communication with the second interior volume, and further wherein a first side of the rupturable barrier is in fluid communication with the first and second seals; and the rupturable barrier is configured to rupture when the pressure acting on the first side of the rupturable barrier is less than a maximum rated operating pressure of the second seal.

2. A measurement system, comprising:

a housing;

a sensing element mounted on the housing for measuring a characteristic of a fluid, the sensing element comprising a first seal for discouraging leakage of the fluid into the housing;

a second seal in fluid communication with the first seal;

an electrical conductor extending through said second seal;

a rupturable barrier;

wherein:

the electrical conductor is a pin;

the pin is mounted coaxially within the second seal; the housing is an electrical junction box comprising an outer wall, a cover mountable on the outer wall, and an inner wall that divides the electrical junction box into a first and a second interior volume; and the second seal is mounted on the inner wall so that the pin extends through the inner wall between the first and second interior volumes; and further wherein a first side of the rupturable barrier is in fluid communication with the first and second seals; and the rupturable barrier is configured to rupture when the pressure acting on the first side of the rupturable barrier is less than a maximum rated operating pressure of the second seal.

3. The measurement system of claim 2, wherein the rupturable barrier is mounted on the cover or the outer wall of the electrical junction box.

\* \* \* \* \*